Patented June 2, 1953

2,640,848

UNITED STATES PATENT OFFICE 2,640,848

ESTERS OF SULFUR-CONTAINING POLYCARBOXYLIC ACIDS

Denham Harman, Berkeley, and De Loss E. Winkler, Orinda, Calif., assignors to Shell Development Company, San Francisco, Calif., a corporation of Delaware No Drawing. Application October 15, 1949, Serial No. 121,637

11 Claims. (Cl. 260—481)

This invention relates to a new class of organic sulfur-containing compounds. More particularly, the invention relates to esters of sulfur-containing polycarboxylic acids, and to their utilization, particularly as plasticizers for organic resinous compositions.

Specifically, the invention provides new and valuable esters of polycarboxylic acids containing at least one sulfonyl radical joined to carbon atoms in an open-chain portion of their molecule and monohydric alcohols containing at least six carbon atoms, said esters being free of any aliphatic unsaturation. The invention also provides organic resinous compositions, particularly the vinyl-type polymers, plasticized with the above-described novel esters.

Vinyl-type polymers, particularly the vinyl halide polymers, may be utilized for many applications in industry due to their wide range of properties. The polymers find application in the production of coating compositions, fibers, films, shaped articles, and the like. These polymers are usually difficult to process and are quite brittle, however, and before they can be utilized in many of their applications it is necessary to add thereto some type of plasticizing agent. The inherent insolubility of many of these polymers makes it difficult to find satisfactory plasticizers. Substances which act as plasticizers for other resinous material, such as the cellulose derivatives, are in many cases incompatible with this type of polymer. In addition, many of the compounds which are compatible are required in such large amounts as to impair the desired physical properties of the said polymer. Other compounds which are otherwise satisfactory as plasticizers have a tendency to evaporate from the plasticized composition after short periods of exposure to heat and the composition then becomes brittle and disintegrates. Still other compounds act as satisfactory plasticizers at or above room temperature but when the temperature is lowered to 0° C. and below the plasticized composition loses its flexibility and is easily cracked.

It is an object of the invention, therefore, to provide a new class of plasticizers for the vinyl-type polymers. It is a further object to provide plasticizers for the vinyl-type polymers which have relatively low volatility and are not readily lost from the compounded resin when it is exposed to high temperatures. It is a further object to provide plasticizers for the above-described polymers which impart good low temperature flexibility to the said resin. It is a further object to provide plasticized vinyl-type polymers which possess many improved physical properties. It is a further object to provide a new class of organic sulfur-containing compounds and a method for their preparation. It is a further object to provide novel sulfur-containing esters which possess many unexpected and beneficial properties. Other objects and advantages of the invention will be apparent from the following detailed description thereof.

It has now been discovered that these and other objects may be accomplished by the esters of polycarboxylic acids containing at least one sulfonyl radical joined to carbon atoms in an open-chain portion of their molecule and monohydric alcohols containing at least six carbon atoms, said esters being free of any aliphatic unsaturation. These esters have proved to be superior plasticizers for the vinyl-type polymers as they are highly compatible therewith and yield plasticized compositions having excellent tensile strength and flexibility over a wide range of temperatures. In addition, they have been found to have a very low rate of volatilization from the vinyl-type polymers, and compositions containing these esters are able to withstand long periods of exposure to air and/or relatively high temperatures without shrinking or undergoing any deterioration.

The sulfur-containing acids used in producing the novel esters of the invention comprise the polycarboxylic acids containing at least one sulfonyl radical (—$SO_2$—) joined to carbon atoms polymerizable in an open-chain portion of their molecule and being free of any aliphatic unsaturation, i. e., free of any ethylenic or acetylenic linkages. The acids may contain two, three, four or more carboxyl groups. The open-chain portion of the molecule containing the sulfonyl radical or radicals may be further substituted with alicyclic, heterocyclic or aromatic radicals which in turn may be substituted with non-interfering substituents, such as halogen atoms, alkoxy radicals, and the like. Illustrative examples of these acids are beta,beta-sulfonyldipropionic acid, i. e., $HOOC(CH_2)_2SO_2(CH_2)_2COOH$, gamma,gamma'-sulfonyldibutyric acid, gamma,gamma'-sulfonyldihexanoic acid, 4,6-disufonylsuberic acid, i. e., $HOOC(CH_2)_2SO_2CH_2SO_2CH_2COOH$, 4,7-disulfonylsebacic acid, 4,11-disulfonyltetradecanedioic acid, 4,7,10-trisulfonyltridecanedioic acid, 3,6 - disulfonyl - 1,2,7-octanetricarboxylic acid, 2,5 - disulfonyl-1,3,6 - hexanetricarboxylic acid, 3,6-disulfonyloctanedioic acid, beta,beta'-sulfonyldivaleric acid, 2-sulfonyl-1,3,5-pentanetricarboxylic acid, carboxybenzyl-sulfonyl-methane carboxylic acid, 1,2,3-tri(sulfonylethylcarboxy)-propane, and beta,beta-sulfonyldichloropropionic acid.

The preferred sulfur-containing acids to be used in producing the novel esters of the invention are the dicarboxylic acids containing not more than 28 carbon atoms and having from 1 to 3 non-adjacent methylene groups joined to carbon atoms in an open-chain portion of the acid molecule replaced by a sulfonyl radical, and the tricarboxylic acids containing not more than 28 carbon atoms and having from 1 to 3 non-adjacent methylene groups joined to carbon atoms in an open-chain portion of the acid molecule replaced by a sulfonyl radical. Examples of the preferred acids are beta,beta'-sulfonyldipropionic acid, gamma,gamma'-sulfonyldicapric acid, 4,7-disulfonylsebacic acid, 3,6-disulfonyl-1,6-octanedioic acid, 4-sulfonyl-1,2,6-hexanetricarboxylic acid, 2,4-disulfonyl-1,3,6-hexanetricarboxylic acid, and 2,4,6-trisulfonyl-1,3,10-tetradecanetricarboxylic acid.

Particularly preferred sulfur-containing acids are the dicarboxylic acids containing not more than 28 carbon atoms and having from 1 to 3 non-adjacent methylene groups joined to carbon atoms in an open-chain portion of the acid molecule replaced by sulfonyl radicals, one of said sulfonyl radicals preferably being not more than 8 carbon atoms from one of the said carbonyl groups.

A special group of the above-described acids are those of the formula

HOOC—R₁—SO₂—R₂—COOH wherein R₁ is a divalent saturated aliphatic open-chain hydrocarbon radical, preferably containing from 1 to 8 carbon atoms, and R₂ is a divalent hydrocarbon radical free of aliphatic unsaturation joined to the sulfonyl and carboxyl groups through aliphatic carbon atoms and preferably containing from 1 to 13 carbon atoms. Examples of these acids are beta,beta'-sulfonyldipropionic acid, gamma,gamma'-sulfonyldibutyric acid, gamma,gamma'-sulfonyldihexanoic acid, beta,beta'-sulfonyldibutanoic acid, beta,-beta'-sulfonyldioctanoic acid, and carboxycyclohexylsulfonylbutanoic acid.

The acids of the formula

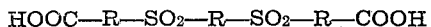

HOOC—R—SO₂—R—SO₂—R—COOH wherein R is a divalent saturated aliphatic open-chain hydrocarbon radical, preferably containing 1 to 8 carbon atoms, also present a particularly preferred group, especially when the novel esters are to be used as plasticizers for the vinyl-type polymers. Examples of these preferred acids are 4,7-disulfonylsebacic acid, 4,11-disulfonyltetradecanedioic acid, 3,6-disulfonyl-1,7-octanedicarboxylic acid, and 4,7-disulfonyl-2,5-heptadienedioic acid.

The above-described sulfur-containing acids may be prepared by any suitable method. They are preferably prepared by oxidizing the corresponding thiopolycarboxylic acid. Complete oxidation of the thio group produces the sulfonyl acids.

The oxidation of the thio acids may be effected by any of a large number of oxidizing agents, such as hydrogen peroxide, permanganates, bromides, fuming nitric acid, chromic acid, and perbenzoic acid. The oxidation may also be accomplished by treating the acids with molecular oxygen, preferably in the presence of catalysts. The amount of the oxidizing agent to be employed will vary over a considerable range. As used throughout the specification the expression "chemical equivalent amount" refers to the amount of agent necessary to furnish one atom of oxygen for every thio linkage to be oxidized. It is generally desirable to react the thio acid with at least twice the chemical equivalent amount of oxidizing agent. Preferably, the thio acid and agent are reacted in chemically equivalent ratios of 1:2 to 1:2.5, respectively.

The oxidation may be accomplished in the presence of solvents or diluents. Examples of suitable solvents and diluents are glacial acetic acid, acetone, benzene, toluene, xylene, and the like, and mixtures thereof.

The temperature employed during the oxidation may vary over a considerable range depending upon the type of reactants and oxidizing agents employed. It is generally desirable to maintain the temperature between about 50° C. and 125° C. Cooling may be employed if necessary. Atmospheric, superatmospheric or subatmospheric pressures may be employed as desired.

The sulfonyl acids formed in the reaction mixture may be recovered therefrom by any of the conventional methods, such as extraction, distillation, fractional precipitation, and the like.

The thio acids used in the above-described process may be prepared by a variety of methods. They may be prepared by reacting a halo-substituted monocarboxylic acid salt with an alkali metal sulfide, such as sodium sulfide, or by reacting a sulfhydryl-substituted monocarboxylic acid salt with a halo-substituted monocarboxylic acid salt. They may also be prepared by reacting hydrogen sulfide or an organic dithiol, such as 1,2-ethanedithiol, with an unsaturated nitrile, such as acrylonitrile, in the presence of an activating agent, such as ultraviolet light, organic peroxides, or basic catalysts, and subsequently hydrolyzing the nitrile. The reaction conditions for this latter method are described in detail hereinafter.

The alcohols used in producing the novel esters of the invention comprise the monohydric alcohols containing at least six carbon atoms and being free of aliphatic unsaturation. The expression "aliphatic unsaturation" refers to ethylenic or acetylenic linkages contained between two aliphatic carbon atoms. The alcohols may be aliphatic, alicyclic, heterocyclic, or aromatic and may be substituted if desired with non-interfering substituents, such as the halogen atoms, alkoxy radicals, and the like. Examples of these alcohols are hexanol, isoheptanol, octanol, tert-octanol, 2-ethylhexanol, 2,5-dimethylheptanol, dodecanol, tetradecanol, pentadecanol, octadecanol, 3,5,8-triethyldodecanol, cyclohexanol, methylcyclohexanol, tert-butylcyclohexanol, cyclohexylpropanol, octanediol monoacetate, hexanediol monoethyl ether, benzyl alcohol, furfuryl alcohol, alpha-benzyl furfuryl alcohol, 2-imidazolemethanol, bromophenol, thiophenol, thiazanthenol, 3-bromooctanol, 5-methoxydodecanol, naphthalenepropanol, and the like.

The preferred alcohols to be used in producing the novel esters are the members of the group consisting of the aliphatic monohydric alcohols containing from 6 to 20 carbon atoms and the aromatic monohydric alcohols containing from 6 to 20 carbon atoms, said alcohols being free of aliphatic unsaturation. Examples of these preferred alcohols are heptanol, 2-ethyl-heptanol, decanol, cyclohexanol, methylcyclohexanol, benzyl alcohol, diphenylcarbinol, and guaiacol.

The particularly preferred alcohols are the saturated open-chain aliphatic monohydric alcohols containing from 8 to 15 carbon atoms, such as 2-butyloctanol, 2-ethylheptanol, 2-ethylhexanol, octanol, decanol, 3,4-dibutylhexanol, pentadecanol, and 3,6,8-trimethyldecanol.

The carbocyclic alcohols, i. e. the alicyclic alcohols and the aromatic alcohols containing from 6 to 15 carbon atoms, also present a preferred group, particularly when the novel esters are to be used as plasticizers for the vinyl-type polymers. Examples of these alcohols are cyclohexanol, methylcyclohexanol, tert-butylcyclohexanol, benzyl alcohol, phenol, guaiacol, cyclohexylmethanol, and the like.

The novel esters of the invention are theoreticaly derived by esterifying any of the above-described sulfur-containing acids with one or a mixture of two or more of the above-described alcohols. Illustrative examples of the novel esters are dihexyl beta, beta'-sulfonyldibutyrate, dioctyl beta,beta' - sulfonyldipropionate, di - tert - butylcyclohexyl 3,6-disulfonylazelate, trioctyl 2-sulfonyl - 1,3,5 - pentanetricarboxylate, hexyl octyl beta,beta'-sulfonyldicaprate, diphenyl gamma,-gamma' - sulfonydivalerate, trioctyl 3,6 - disulfonyl - 1,2,7 - octanetricarboxylate, 2 - ethylhexyl decyl beta,beta'-sulfonyldichlorohexanate and dinonyl 4,7-disulfonyl-2,5-heptanedioate.

The preferred esters of the invention, i. e., those prepared from the preferred sulfur-containing acids and the preferred monohydric alcohols, may be exemplified by di-2-ethylhexyl beta,beta'-sulfonyldipropionate, dicyclohexyl beta,beta'-sulfonyldivalerate, trioctyl 3,6 - disulfonyl - 1,2,7-octanetricarboxylate, and dimethylcyclohexyl 4,7-disulfonyl-2,5-heptanedioate.

The novel esters of the invention may be prepared by a variety of methods. They may be prepared, for example, by reacting the acids containing the sulfonyl radical or radicals with the desired alcohol, by reacting an acid chloride of the sulfur-containing acids with the alcohol in pyridine, by an ester exchange reaction wherein ester derivatives of either the aforedescribed sulfur-containing acids or desired alcohols are reacted with the free alcohol or acid or their esters in the presence of an ester-exchange catalyst, or alternatively by reacting the corresponding thio acid with the desired alcohol and subsequently oxidizing the thio acid ester to the desired sulfonyl form, or still further by reacting an unsaturated acid with the desired alcohol, adding hydrogen sulfide or an organic polythiol thereto, and subsequently oxidizing the resulting thio-substituted ester to the desired sulfonyl form.

The direct esterification of the sulfonyl radical or radicals with the desired alcohols, or the esterification of the thio acids or the unsaturated acids with the desired alcohols, as described above, is preferably accomplished by heating the alcohols and acids together in the presence of an esterification catalyst and removing the water formed during the reaction, preferably by distillation. Examples of catalysts that may be used for this type of reaction are p-toluenesulfonic acid, ethylsulfonic acid, hydrobromic acid, chloroacetic acid, sulfuric acid, benzenesulfonic acid, formic acid, boron and silicon fluorides, acid salts, such as monosodium and monopotassium sulfates, and salts of strong acids and weak bases, such as aluminum sulfate, zinc chloride, zinc sulfate, and the like. The amount of the catalyst employed will vary over a wide range depending upon the particular type of reactants, catalyst, and reaction conditions employed. In most cases, the amount of catalyst will vary from 0.1% to 5% by weight of the reactants.

The amount of acid and alcohol to be utilized in the reaction will vary over a considerable range depending upon the type of product desired. In general, the acids are reacted with at least a chemical equivalent amount of the alcohol. As used throughout the specification and claims, the expression "chemical equivalent amount" is meant the amount of reactant necessary to furnish approximately one hydroxyl group for every carboxyl group to be esterified. Preferably the acid and alcohol are reacted in chemical equivalent ratios varying from 1:1 to 1:2, respectively.

The esterification may be accomplished in the presence or absence of solvents or diluents. In case solvents or diluents are desired, organic compounds, such as benzene, toluene, cyclohexane, xylene, and mixtures thereof, which do not interfere with the reaction, are generally preferred.

The temperature employed in the esterification process may vary over a considerable range. In general, temperatures varying between about 70° C. and 150° C. are preferred. Particularly preferred temperatures range from 80° C. to 100° C. Higher or lower temperatures may be utilized, however, if desired or necessary. Atmospheric, superatmospheric, or subatmospheric pressures may be employed.

The separation of the esters formed in the reaction may be accomplished by any suitable means, such as extraction, distillation, fractional precipitation, and the like.

If the esters are prepared by reacting a thio acid with the desired alcohol and oxidizing the resulting ester to the sulfonyl form, or by reacting an unsaturated acid with the alcohol, adding hydrogen sulfide or an organic polythiol, and subsequently oxidizing the resulting thio ester, the oxidation of the thio linkage may be accomplished by the method described hereinabove for the preparation of the sulfonyl acids from the corresponding thio acids.

The thio esters used in the above-described process are preferably prepared by reacting hydrogen sulfide or an organic polythiol with an unsaturated ester in the presence of ultraviolet light, peroxide catalysts, or basic catalysts. The organic polythiols used in this reaction may be exemplified by 1,2-ethanedithiol, 1,4-butanedithiol, 1,6-hexanedithiol, cyclohexanedithiol, 1,2,3-propanetrithiol, and 1,7-decanedithiol. The unsaturated esters used in the reaction may be exemplified by cyclohexyl crotonate, octyl acrylate, benzyl crotonate, dodecyl 4-butenoate, tetradecyl 4-heptenoate, and the like.

Light rays that may be used for this addition reaction are preferably those having wavelengths between 1800 Angstroms and 3500 Angstroms, particularly those between 2000 and 3000 Angstroms. The peroxide catalyst may be illustrated by tertiary-butyl hydroperoxide, 2,2-bis(tertiary-butylperoxy)butane, di-tertiary-butyl peroxide, acetyl peroxide, tertiary-butyl perbenzoate, and the like. The basic catalysts may be exemplified by sodium hydroxide, potassium, ammonia, dibutyl amine, diethyl amine, and the like. The amount of the catalyst employed will vary over a considerable range. In most cases the amount will generally vary from 0.1% to 4% by weight of the reactants. The reaction may be accomplished in the presence or absence of solvents or diluents. If solvents or diluents are employed, they should be organic compounds which are inert, such as benzene, toluene, xylene, and the like. The amount of reactants to be utilized in the addition reaction may vary considerably. It is generally preferred to react the hydrogen sulfide or organic polythiol with at least an equivalent amount of unsaturated ester, i. e., an amount of ester sufficient to furnish one unsaturated linkage for every thiol group. The temperatures utilized will vary depending upon the reactants and catalyst selected. In most cases, the temperature will range from 80° C. to 200° C., with a preferred range varying from 90° C. to 150° C. Atmospheric, superatmospheric or subatmospheric pressures may be utilized. The thio esters may be recovered from the reaction mixture by any conventional method, such as distillation, fractional precipitation, extraction, and the like.

The novel esters of the invention possess many unique properties which make them particularly useful and valuable in industry. They may be used, for example, as synthetic lubricating oils, asphalt adhesive agents, water-proofing agents for inorganic gel greases, as thickening agents or viscosity index improvers, tackifiers, solvents, rubber preservatives, vulcanizing accelerators, insecticidal and germicidal compositions, or additives therefor, additives for dye preparations, textile lubricants, wetting agents, dispersing agents for oils, polishes, protective waxes, and the like. They are particularly valuable as plasticizers for organic resinous compositions, such as cellulose nitrate, cellulose acetate, cellulose butyrate, cellulose acetobutyrate, and ethyl cellulose, the casein and other protein plastics, lignin plastics, synthetic linear polyamides, phenol-aldehydes type resins, urea-aldehyde type resins, and the like. The novel esters are especially valuable as plasticizers for the vinyl-type polymers, such as polyvinyl chloride, and when used in this capacity produce plasticized compositions possessing many superior properties.

Vinyl-type polymers that may be plasticized with the above-described compounds are the homopolymers, copolymers and interpolymers of the vinyl-type monomers. Vinyl-type monomers include all those organic compounds containing at least one $CH_2=C<$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methyl glutarate; the vinyl esters of the unsaturated acids, such as vinyl acrylate, vinyl crotonate, and vinyl methacrylate.

A preferred group of vinyl-type polymers to be plasticized with the esters are the polymers of the halogen-containing vinyl-type monomers. Examples of this preferred group of polymers are polyvinyl chloride, polyvinyl bromide, polyvinylidene chloride, polyvinylidene bromide, copolymers of vinyl chloride and vinyl acetate, copolymers of vinyl chloride and vinylidene chloride, copolymers of allyl chloride and vinyl chloride, copolymers of vinylidene chloride and vinyl acetate, copolymers of vinyl chloride and methyl methacrylate, and the like.

Particularly preferred polymers to be plasticized with the novel esters of the invention are the vinyl halide polymers. The expression "vinyl halide polymer" as used throughout the specification and claims refers to polymers containing a predominant quantity, i. e. at least 60% by weight, of a vinyl halide, such as vinyl chloride and vinyl bromide. Examples of these polymers are polyvinyl chloride, polyvinyl bromide, copolymers of vinyl chloride and vinyl acetate, copolymers of vinyl chloride and methyl methacrylate, and copolymers of vinyl bromide and vinyl propionate.

A single ester may be used as the plasticizer, or a mixture of two or more of the compounds may be utilized. In addition, the compounds may be used in combination with other plasticizers, such as dioctyl phthalate, dibutyl phthalate, tricresyl phosphate, and the like.

The amount of the plasticizers to be incorporated with the above-described vinyl-type polymers may vary over a considerable range depending upon the particular type of polymer to be utilized, the intended use of the compounded resin, etc. In most cases the amount of the plasticizer will vary from about 20 to 150 parts by weight for every 100 parts by weight of polymer. A more preferred range comprises 40 parts to 75 parts by weight of plasticizer for every 100 parts by weight of resin.

Fillers and pigments such as whiting, channel black, clay, gum rosin, silica and others, and stabilizers, such as litharge, some oxides of bismuth and barium types, and some silicates may also be added to the polymer along with the novel compounds of the invention.

The polymer and plasticizer may be compounded together by means of conventional equipment such as mills of the heated roll type or internal mixers. The plasticizer and other compounding ingredients, such as fillers and stabilizers, are worked into the vinyl polymer so that they are thoroughly dispersed therein by means of such equipment, and the resultant composition then molded, extruded or otherwise formed into articles of the desired shape by conventional procedure.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts described in the examples are parts by weight.

Volatility of the plasticized composition disclosed in the following examples was determined on compression molded discs two inches in diameter and 0.045 inch thick. The discs were conditioned for one hour at 100° C., weighed, placed back in the oven for 100 hours at 100° C., and reweighed. The difference in weight represents the amount of plasticizer lost. The loss of plasticizer was then compared with the loss of a similar resin plasticized with dioctyl phthalate, the latter being arbitrarily assigned a value of unity.

*Example I*

About 98 parts of 2-ethylhexyl crotonate, 10.2 parts of hydrogen sulfide and 3.7 parts of n-butyl amine were placed in a stainless steel bomb and heated to a temperature of 115° C. for 48 hours. The reaction mixture was then distilled to produce di(2-ethylhexyl) beta,beta'-thiodibutyrate having the following physical properties: $n_D^{20}$ 1.4656; B. P. at 1 mm. 200° C.–201° C.

About 17 parts of a 30% solution of hydrogen peroxide was slowly added to a mixture of 64 parts of the di(2-ethylhexyl) beta,beta'-thiodibutyrate and 200 parts of glacial acetic acid. The temperature was between 25° C. and 30° C. After the exothermic reaction had ceased, another 17 parts of peroxide solution was added and the combined mixture allowed to stand at room temperature two days. 300 parts of benzene was then added and the solution washed several times with water to remove acetic acid. Finally the benzene and traces of water were removed by topping to a kettle temperature of 125° C. under 2 mm. pressure. The resulting product was di(2-ethylhexyl) beta,beta'-sulfonyldibutyrate, a light yellow viscous liquid having a refractive index of $n_D^{20}$ 1.4659; S, percent weight found 7.0(9), calc. 6.93.

*Example II*

About 92 parts of 2-ethylhexyl acrylate, 10.2 parts of hydrogen sulfide and 3.7 parts of n-butyl amine were placed in a stainless steel bomb and heated to a temperature of 100° C. to 115° C. for about 48 hours. The reaction mixture was then distilled to produce di(2-ethylhexyl) beta,beta'-thiodipropionate.

17 parts of a 30% solution of hydrogen peroxide was slowly added to a mixture of 58 parts of the di(2-ethylhexyl) beta,beta'-thiodipropionate and 200 parts of glacial acetic acid. After the exothermic reaction had ceased, another 17 parts of peroxide solution was added and the combined mixture allowed to stand at room temperature for two days. 300 parts of benzene was then added and the solution washed with water to remove the acetic acid. The mixture was then distilled to produce di(2-ethylhexyl) beta,beta'-sulfonyldipropionate, a viscous liquid having a refractive index of $n_D^{20}$ 1.4656.

*Example III*

About 88 parts of cyclohexyl crotonate, 10.2 parts of hydrogen sulfide and 3.7 parts of n-butyl amine are heated to a temperature between 100° C. and 115° C. for about 48 hours. The reaction mixture is then distilled to produce dicyclohexyl beta,beta'-thiodibutyrate.

17 parts of a 30% solution of hydrogen peroxide is then slowly added to a mixture of about 55 parts of dicyclohexyl beta,beta'-thiodibutyrate and 200 parts of glacial acetic acid. After the exothermic reaction has ceased, another 17 parts of peroxide solution is added and the combined mixture allowed to stand for about two days. The mixture is then washed as shown in Example I and distilled to produce dicyclohexyl beta,beta'-sulfonyldibutyrate.

*Example IV*

About 214 parts of 2-ethylhexyl acrylate, 94 parts of ethanedithiol and 4 parts of piperidine are heated at 100° C. for several hours. The reaction mixture is then washed several times with dilute sodium hydroxide and distilled to produce di(2-ethylhexyl) 4,7-dithiasebacate.

30 parts of a 30% solution of hydrogen peroxide is then added to a mixture of about 60 parts of the di(2-ethylhexyl) 4,7-dithiasebacate and 300 parts of glacial acetic acid. After the exothermic reaction has ceased, another 30 parts of peroxide solution is added and the combined mixture allowed to stand for several days. The mixture is then washed as shown in Example I and distilled to produce di(2-ethylhexyl) 4,7-disulfonylsebacate.

*Example V*

About 98 parts of benzyl acrylate, 10.2 parts of hydrogen sulfide and 3.7 parts of n-butyl amine are heated to a temperature between 100° C. and 115° C. for 50 hours. The reaction mixture is then distilled to produce dibenzyl beta,beta'-thiodipropionate.

17 parts of a 30% solution of hydrogen peroxide is added to a mixture of about 60 parts of the dibenzyl beta,beta'-thiodipropionate and 200 parts of glacial acetic acid. After the exothermic reaction has ceased, another 17 parts of peroxide solution is added and the combined mixture allowed to stand for several days. The mixture is then washed and distilled to produce dibenzyl beta,beta'-sulfonyldipropionate.

*Example VI*

About 250 parts of octyl methacrylate, 144 parts of hexanedithiol and 4 parts of piperidine are heated at 100° C. for several hours. The reaction mixture is then washed several times with dilute sodium hydroxide and distilled to produce dioctyl 2,13-dimethyl-4,11-dithiatetradecanedioate.

30 parts of a 30% solution of hydrogen peroxide is added to a mixture of about 80 parts of the dioctyl 2,13-dimethyl-4,11-dithiatetradecanedioate and 300 parts of glacial acetic acid. After the exothermic reaction has ceased, another 30 parts of peroxide solution is added and the combined mixture allowed to stand for several days. The mixture is then washed as shown in Example I and distilled to produce dioctyl 2,13-dimethyl-4,11-disulfonyltetradecanedioate.

*Example VII*

About 100 parts of polyvinyl chloride was compounded with 50 parts of di-2-ethylhexyl beta,beta'-sulfonyldipropionate produced in Example II by mixing the two ingredients together with 2 parts (per 100 parts of polymer) of a trade stabilizer, milling the mixture together on a roll mill at a temperature between 130° C. and 150° C. and then molding the resulting sheets at 160° C. for two minutes. The resulting sheets had no unpleasant odor, possessed excellent tensile strength and flexibility over a wide range of conditions, and possessed good color and heat stability. The plasticized composition showed a volatility of only 0.3 that of a similar composition plasticized with dioctyl phthalate.

A similar composition plasticized with dibutyl alpha,alpha'-sulfonyldiacetate had a grayish tinge, unpleasant odor and a volatility of over 5 times that of a similar composition containing dioctyl phthalate.

*Example VIII*

About 100 parts of polyvinyl chloride was compounded with 50 parts of di-2-ethylhexyl beta,beta'-sulfonyldibutyrate by the method disclosed in Example VII. The resulting sheet possessed good tensile strength and flexibility over a wide range of conditions, and had good color and heat stability. The plasticized composition showed a volatility of only 0.2 that of a similar composition plasticized with dioctyl phthalate.

Example IX

About 100 parts of polyvinyl chloride is compounded with 50 parts of dicyclohexyl beta,beta'-sulfonyldibutyrate by the method disclosed in Example VII. The resulting sheet possesses low volatility and good tensile strength.

Example X

About 100 parts of a copolymer of 95% vinyl chloride and 5% vinyl acetate is compounded with 50 parts of di(2-ethylhexyl) 4,7-disulfonylsebacate by the method disclosed in Example VII. The resulting sheet possesses good tensile strength and flexibility over a wide range of conditions, and undergoes little change in shape or composition when exposed to high temperatures.

We claim as our invention:

1. Di(2-ethylhexyl) beta,beta'-sulfonyldibutyrate.
2. Di(2-ethylhexyl) beta,beta'-sulfonyldipropionate.
3. Di(2-ethylhexyl) 4,7-disulfonylsebacate.
4. Dicyclohexyl beta,beta'-sulfonyldibutyrate.
5. An ester of (1) a dicarboxylic acid containing not more than 28 carbon atoms and having from 1 to 3 non-adjacent methylene groups joined to carbon atoms in an open-chain portion of the acid molecule replaced by a sulfonyl radical, and (2) an aliphatic saturated monohydric alcohol containing from 8 to 15 carbon atoms, said ester being free of aliphatic carbon-to-carbon unsaturation.
6. An ester as defined in claim 5 wherein the dicarboxylic acid is beta,beta'-sulfonyldipropionic acid.
7. An ester as defined in claim 5 wherein the dicarboxylic acid is beta,beta'-sulfonyldibutyric acid.
8. An ester of (1) a dicarboxylic acid containing not more than 28 carbon atoms and having from 1 to 3 non-adjacent methylene groups joined to carbon atoms in an open-chain portion of the acid molecule replaced by sulfonyl radicals, and (2) a carbocylic monohydric alcohol containing from 6 to 20 carbon atoms, said ester being free of any aliphatic carbon-to-carbon unsaturation.
9. An ester of (1) a tricarboxylic acid containing not more than 28 carbon atoms and having from 1 to 3 non-adjacent methyl groups joined to carbon atoms in an open-chain portion of the acid molecule replaced by sulfonyl radicals, and (2) a monohydric alcohol containing from 6 to 20 carbon atoms, said ester being free of any aliphatic carbon-to-carbon unsaturation.
10. An ester of (1) a polycarboxylic acid having from 1 to 3 non-adjacent methylene groups joined to carbon atoms in an open-chain portion of the acid molecule replaced by sulfonyl radicals, and (2) an aromatic monohydric alcohol containing from 6 to 20 carbon atoms, said ester being free of any aliphatic carbon-to-carbon unsaturation.
11. An ester of (1) a polycarboxylic acid containing at least one sulfonyl radical joined to carbon atoms in an open-chain portion of its molecule, and (2) a monohydric alcohol containing from 6 to 20 carbon atoms, said ester being free of any aliphatic carbon-to-carbon unsaturation.

DENHAM HARMAN.
DE LOSS E. WINKLER.

References Cited in the file of this patent

UNITED STATES PATENTS

| Number | Name | Date |
|---|---|---|
| 2,028,091 | Jaeger | Jan. 14, 1936 |
| 2,176,423 | Jaeger | Oct. 17, 1939 |
| 2,427,640 | Whitehill | Sept. 16, 1947 |
| 2,473,708 | Hayes | June 21, 1949 |
| 2,474,350 | Eilerman | June 28, 1949 |
| 2,596,438 | Fraser | Jan. 2, 1951 |